(12) United States Patent
Vassel

(10) Patent No.: US 11,185,788 B2
(45) Date of Patent: Nov. 30, 2021

(54) KINESTHETIC WATER PARK

(71) Applicant: Eugene B. Vassel, Rockville Centre, NY (US)

(72) Inventor: Eugene B. Vassel, Rockville Centre, NY (US)

( * ) Notice: Subject to any disclaimer, the term of this patent is extended or adjusted under 35 U.S.C. 154(b) by 168 days.

(21) Appl. No.: 16/708,361

(22) Filed: Dec. 9, 2019

(65) Prior Publication Data

US 2021/0170289 A1  Jun. 10, 2021

(51) Int. Cl.
  *A63G 31/00* (2006.01)
  *B62B 3/00* (2006.01)
(52) U.S. Cl.
  CPC ............ *A63G 31/007* (2013.01); *B62B 3/007* (2013.01)
(58) Field of Classification Search
  CPC ..................................................... B62B 3/007
  See application file for complete search history.

(56) References Cited

U.S. PATENT DOCUMENTS

| | | | | |
|---|---|---|---|---|
| 3,873,026 A * | 3/1975 | Ochs | ..................... | B05B 3/0427 239/240 |
| 4,205,785 A * | 6/1980 | Stanley | .................. | A63H 23/16 239/17 |
| 5,022,588 A * | 6/1991 | Haase | ................... | B05B 3/0486 239/211 |
| 5,261,603 A * | 11/1993 | Driska | ................... | A63H 3/003 239/211 |
| 6,260,566 B1 * | 7/2001 | LaFave | ..................... | B62J 17/08 135/88.01 |
| 6,454,340 B1 * | 9/2002 | Miller | ....................... | B60J 7/10 135/136 |
| 7,690,146 B2 * | 4/2010 | Jong | ..................... | A01M 29/16 43/1 |

* cited by examiner

*Primary Examiner* — James A Shriver, II
*Assistant Examiner* — James J Triggs

(57) ABSTRACT

A kinesthetic waterpark is provided wherein a child or children move at least one lever to prime a pump system which moves water from a water tank to tubing running along the frame of a canopy. The waterpark may be combined with a wagon or may be used as a standalone recreational waterpark. The waterpark includes a center post connected to a detachable canopy and a pumping system, wherein the pumping system includes a water tank or reservoir, a device to pump the water, and tubes which dispense the water in a desired pattern. In a preferred embodiment, the kinesthetic waterpark is mounted to a wagon, wherein the wagon includes a water sealed seating area with a drainage port, the center post and detachable canopy, and a pumping system.

8 Claims, 5 Drawing Sheets

KINESTHETIC WATER PARK

BACKGROUND

The present invention is directed to a kinesthetic water park for use with children for recreational activities.

Wagons for use in transporting children are well-known, wherein the wagons may comprise a shade or canopy to provide cheap but efficient protection from ultraviolet rays and direct exposure to sunlight. It is also known to provide spraying devices for use as bath toys or for use in yards to cool children on hot days. However, the aforementioned spraying devices require a constant supply of water pressure, provided by a hose or faucet directly connected to a water source associated with a dwelling. AC or DC-powered pumps may be capable of replacing or supplementing a water source by providing enough pressure to eject water, but due to the inherent risk associated with wires and electrical cords in combination with water, such pumps would be generally discouraged.

SUMMARY OF THE INVENTION

The present invention is designed to incorporate the recreational and cooling aspects of a water park, in combination with a fun activity which alleviates the need for a connection to a hose while avoiding the inherent risks of electrical equipment. In a preferred embodiment, the invention comprises a kinesthetic wagon waterpark wherein a child or children move levers which prime a pump system, thereby moving water from a reservoir or water tank to tubing that runs along the frame of a canopy. The tubing will have pores or holes spaced along the tubing to allow water to flow out of the pores or holes, such that the children are cooled by the water on hot and sunny days.

DETAILED DESCRIPTION

Figure 1:
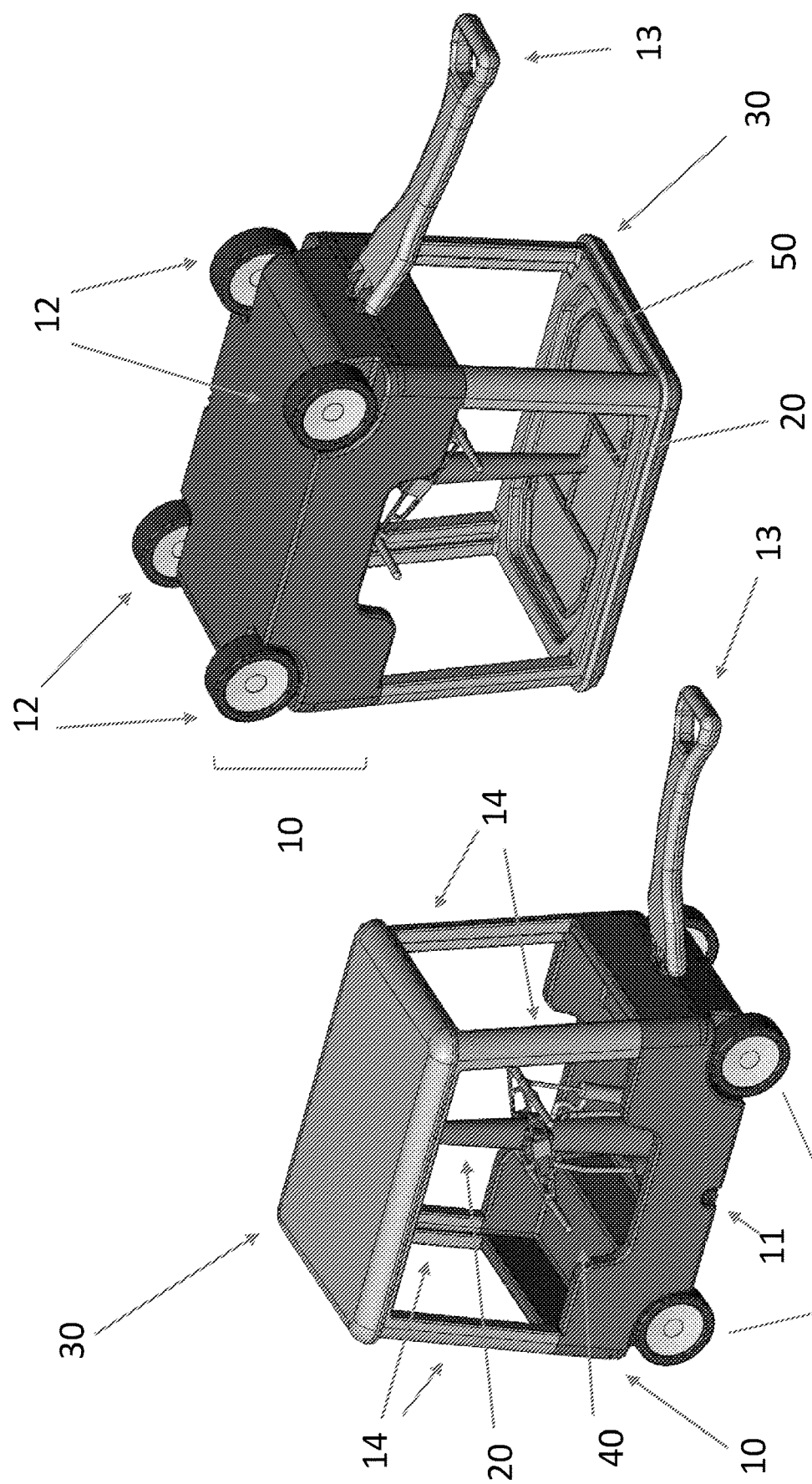
FIG. 1 shows a detailed view of the kinesthetic wagon waterpark when used and inverted.

FIG. 1 depicts the preferred embodiment wherein the kinesthetic waterpark is mounted to a wagon. The wagon comprises a wagon base 10 for children to sit, a canopy post 20, a mount for a pumping system, the pumping system 40, a canopy 30, and canopy supports 14, which attach the canopy to the wagon base.

The wagon base 10 has a water sealed seating area with a drainage port 11 located central to the wagon, although it is contemplated that multiple drainage ports may be incorporated for expedited removal of water, and four wheels 12. The wagon may have any desired shape based on the size and age of the occupants. The wagon comprises a base which is formed and molded from a thermoplastic material, including polyolefins, such as polyethylene and polypropylene, polyesters, such as polyethylene terephthalate, and nylon. In one embodiment, the wagon may comprise recycled thermoplastic material or biodegradable material to reduce costs and/or provide an environmentally friendlier toy.

The drainage ports may comprise a rubber material connected to a rubber ring. Alternatively, the drainage ports may comprise a quick release valve with an attachable screw on a cap. When the cap is securely screwed on, water in the wagon is secure and will not flow through the drainage port. However, unscrewing the cap will allow for water to rapidly drain from the lowest point of the wagon base. The cap will preferably be made from a similar thermoplastic material as the wagon, as using metal runs the risk of corrosion due to the continuous exposure to water.

For safety, the wagon's base will preferably have seat belts to ensure safety of the passengers from unnecessary movement. The wagon will also comprise a handle 13 connected to the front of the wagon to allow for pulling of the wagon by a person, or for attachment to a vehicle if desired.

The canopy post 20 can be made from a variety of materials including thermoplastic materials as set forth above. The canopy post is connected to a center post 21 located on the wagon, wherein the center post is secured to the floor of the wagon's base. The bottom of the post can be affixed to the wagon floor either permanently or temporarily, as desired. If affixed permanently, either an adhesive can be used to join the end of the post to the base, or mechanical fasteners can be used. If affixed temporarily, the post can be positioned in a molded circle with varying sizes to allow for the post to be removed vertically, while securing the post in a sleeve to prevent the post from falling over.

The canopy post 20 includes a canopy 30 which is formed from a variety of materials to shade the occupants of the vehicle, such a canvas. The canopy may comprise a UV protection grade canvas, such as a woven or nonwoven fabric, including a metalized film to provide UV and thermal protection.

Figure 2:
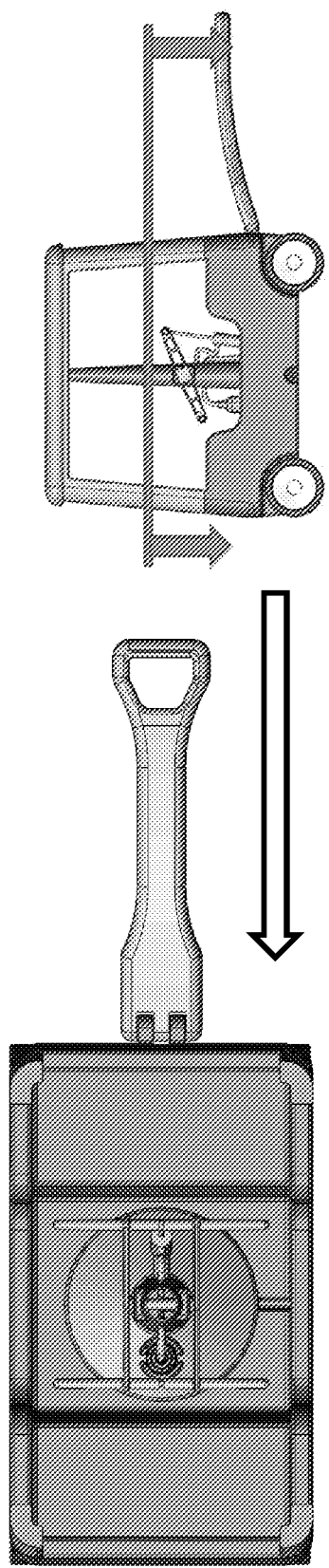
FIG. 2 is a cross-sectional view of the wagon detailing a topical view of the pump pedestal.
Figure 3:
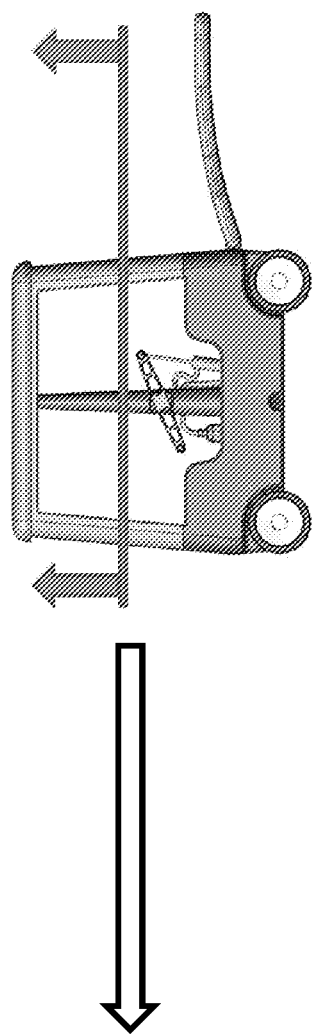
FIG. 3 is a cross-sectional view of the wagon detailing an embodiment of the spray tubes.
Figure 4:
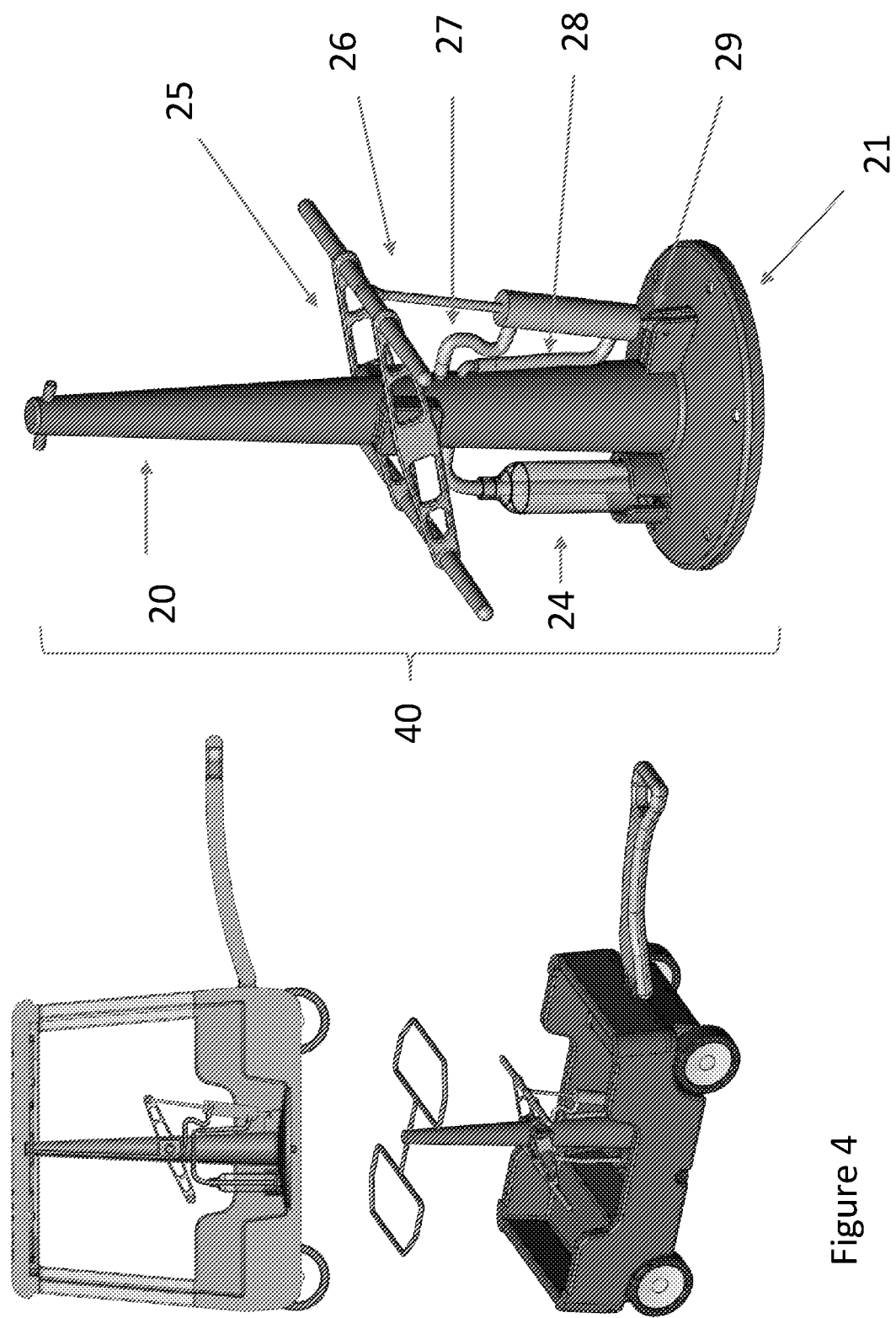
FIG. 4 is a detailed view of the pump system.
Figure 5:
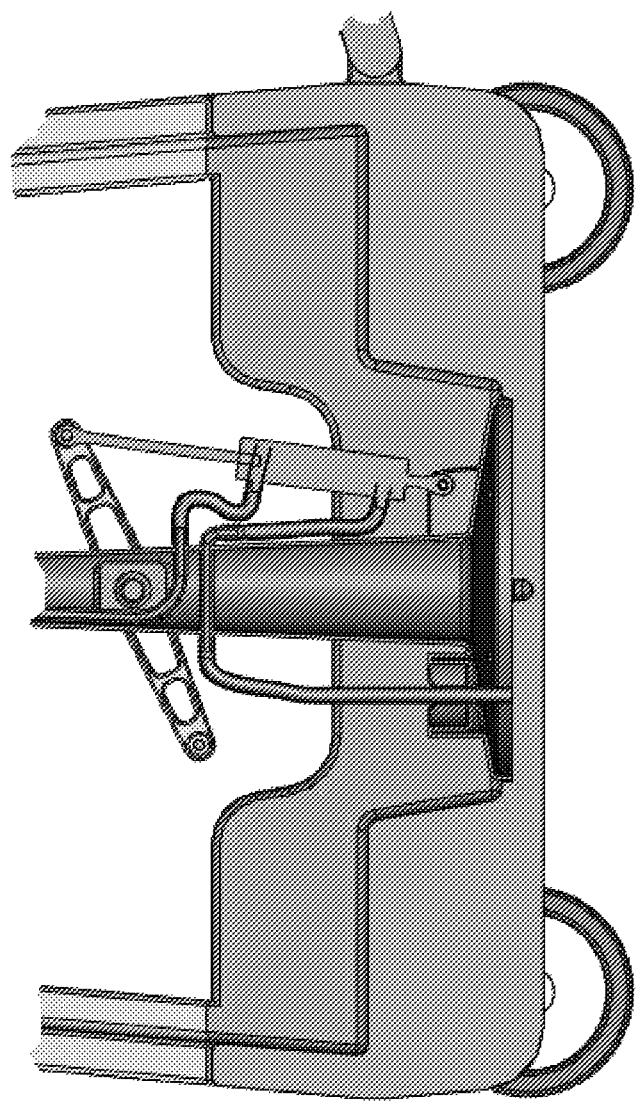
FIG. 5 is a cross-sectional view of the wagon detailing the water supply and drain.

FIG. 2-4 show that proximate to or connected to the canopy post 20 is a mount for a pumping system 40. In one embodiment, the system includes a holder for a bottle, container or reservoir 24 which functions as a fresh water supply reservoir. The shape of the mount may vary based on the desired aesthetics. The holder can be flexible and/or adjustable to allow for different types of bottles, containers or reservoirs, thereby providing options as to the desired amount of water which can be used. The post will have various openings or clips to house tubing provided by the pumping system.

The pumping system comprises a device to pump water comprising a pump handle 22 and a pump 23, and tubing 50, wherein the tubing is connected to the reservoir and the pump. The device may comprise a hand-operated pump handle, a circular crank, or a lever.

Figure 7:
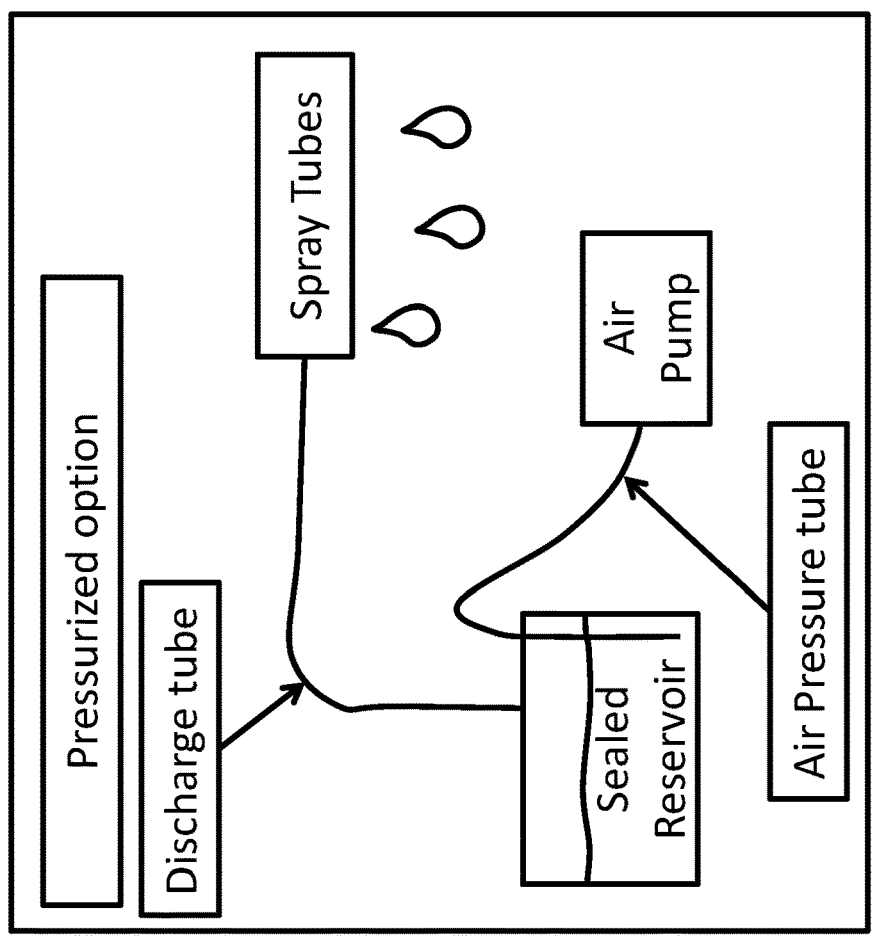
FIG. 7 is a depiction of an alternative plumping schematic.
Figure 6:
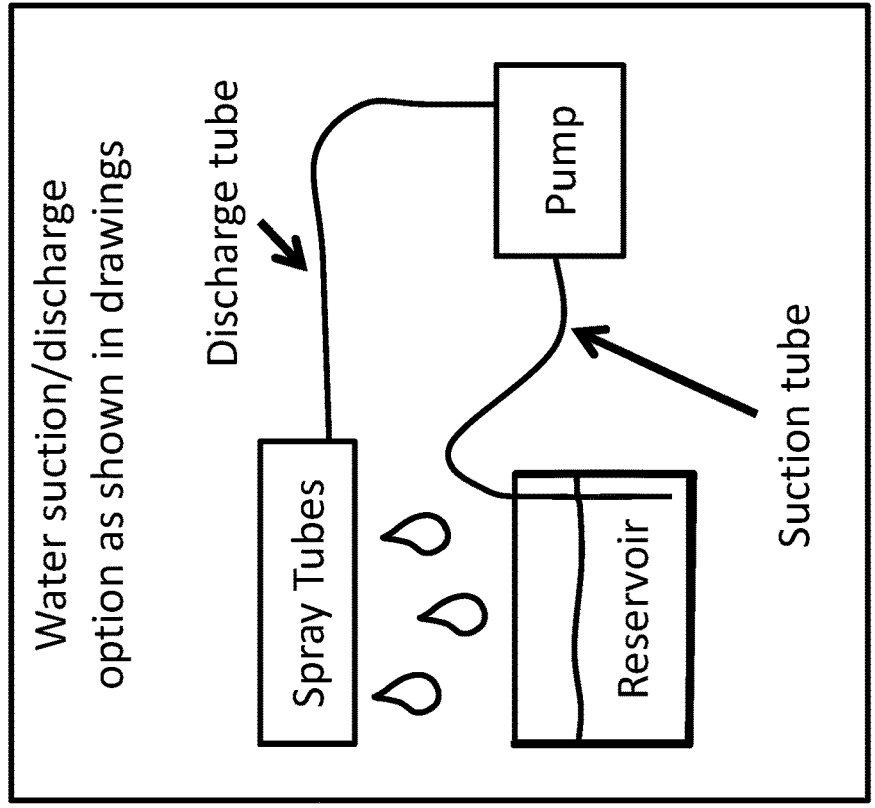
FIG. 6 is a depiction of the plumbing schematic.

As shown in FIG. 4 depicting the hand-operated pump handle embodiment, the pump handle 22 comprises two handles for occupants on either side of the canopy post 20, The pump handle comprises cross supports 25 which stabilize the handles, wherein each of the cross supports is attached at a center point to the canopy post 20, The cross supports may be attached to the canopy post by mechanical attachment including using a nut and bolt, or by molding an insertion protuberance directly from the cross supports into an insertion hold present on the canopy post, Connected to the pump handle 22 is a piston rod 26 which is inserted into the pump 23. The pump is connected to the center post 21 by mechanical attachment, including a nut and bolt indicated at 29. As shown in FIG. 6, the pump creates water pressure through movement, wherein the water from the supply reservoir 24 is drawn through suction tubing 28 into the pump which then exits through discharge tubing 27 which feeds into the spray tubes 50. Alternatively, as shown in FIG. 7, the pump can be replaced with an air pump, such that pressure from using the air pump is directly fed into the reservoir 24 through an air pressure tube. Water from the reservoir exits the reservoir through the discharge tube which feeds into the spray tubes.

Although not shown, a circular crank or lever would be set up in a substantially similar manner as that shown in the FIG. 4, with the exception that the pump handles would be replaced with separate circular cranks or levers, which would capture the same mode of operation as established in the hand-operated pump handle embodiment.

Children will operate the device through rotating movements using their own strength to prime the pump and create pressure in the bottle, container or reservoir. The operation of the device will feed water from the bottle, container or reservoir through the tubes to eventually rain down on the children riding in the wagon. It is contemplated that the device will be wide and comfortable enough for two hands for two children sitting opposite one another, or for single person use.

It is also contemplated that the device may comprise a hand pump or push button system to generate pressure in the bottle, container or reservoir thereby allowing for water to flow out and through the tubing.

Alternatively, the device may be automated wherein water is pumped by a separate battery powered pump located in a water sealed compartment. The pump will be connected to a button which will be mounted on the wagon. In this embodiment, the automated water pump system could run at a variety of speeds to allow a child or parent to operate the water park without requiring movements by the occupants, which would be beneficial on hot days.

FIG. 6 and FIG. 7 show plumbing schematic options within the scope of the invention. As shown in FIG. 6, when used, water is drawn from the bottle, container or reservoir, through suction tubing to a pump and exits through a discharge tube that feeds into spray tubes running internally up the post or exterior to the post. The tubing is secured either with an adhesive or fasteners to the post. In a preferred embodiment, the tubing is mechanically fastened, such as by clips which hold the tubing in place. In this embodiment, the tubing can be removed and periodically cleaned if desired, in the event that mold or other undesirable materials are present interior to the tube.

FIG. 3 shows the spray tubing secured to the ceiling of the canopy with mechanical fasteners. The amount or number of tubes and the arrangement of the tubes is not necessarily limited. However, it is contemplated that the tubing can be arranged to follow the perimeter of the canopy. For example, FIG. 3 shows the tubing in parallel hexagonal arrangements which are located over the occupants of a wagon. Alternatively, the tubing can be arranged at various angles in relation to the center post, such as at 30, 45, or 60 degrees, or the tubing can be arranged in periodic rows, to allow for varying amounts of soaking. It is contemplated that the placement of the tubes is adjustable by the owner, based on the presence of the mechanical fasteners.

The portion of the tubing which is exposed and secured to the ceiling, will have holes or pores to allow for water to exit the tubes. The dimensions of the holes or pores may vary depending on the degree of soaking. For example, if less soaking is desired, the holes or pores may be small in size, to allow for a mist to flow out of the tubes. If more soaking is desired, the holes or pores may be larger in size to allow for higher and more concentrated flow out of the tubes. It is also contemplated that the holes or pores may be uniform in size to allow for uniform soaking, or may vary in size if more random dispersion of water is desired. Similarly, the spacing of the holes or pores throughout the exposed portion of the tubing may vary, such as spacing the holes or pores at least every inch uniformly, or spacing the holes or pores at varying distances to optimize the desired amount of soaking.

In an alternative embodiment the kinesthetic waterpark is used as an individual unit separate from a wagon. The kinesthetic waterpark is preferably used in conjunction with a wading pool, wherein one end of the center post comprises a weighted feature and a material which allows for suctioning to the bottom of a plastic pool. At the base are several openings which lay below a water line. When a hand crank or start button is activated, water is drawn through holes at the base an up the internal tubing which is attached to a hard plastic canopy. Similar to the wagon waterpark, water is directed by water tubing attached to the canopy in a desired design, and ejected down to children below the canopy.

Use:

The kinesthetic waterpark is designed to replace the traditional one-dimensional pull wagon by making it an interactive experience for both children and parents. Kids will use their arm and core muscles by engaging the pump system to generate a rain shower inside their covered wagon. This allows for the kids to be active within a wagon, will simultaneously providing an activity which can be used on long, hot summer days, in a cool and refreshing manner. The waterpark has additional features which allows for use as a mobile pool, sprinkler and splash park such that the activity is not solely limited for use in a wagon.

While the foregoing has described what are considered the best mode and other examples, it is understood that various modifications may be made herein, as it will be apparent to those of ordinary skill in the art that numerous modifications in form, usage and details of implementation may be made without departing from the principles and concept of the invention.

I claim:

1. A kinesthetic waterpark comprising a canopy post having a base and a top portion, a supply reservoir, a pumping system, at least one spray tube, and a canopy, wherein the pumping system comprises a pump handle connected to a pump, wherein the supply reservoir is connected to the pump by a suction tube, wherein the pump is connected to the spray tube by a discharge tube, and wherein the spray tube is positioned in a predetermined pattern on the canopy, the spray tube comprising a plurality of holes for discharge of water, and the spray tube being attached to the canopy.

2. The kinesthetic waterpark of claim 1, further comprising a wagon, wherein the wagon comprises a wagon base, wherein the canopy post is attached to the wagon base.

3. The kinesthetic waterpark of claim 2, wherein the canopy is attached to the wagon base by canopy supports.

4. The kinesthetic waterpark of claim 2, wherein the wagon base comprises a drainage port selected from the group consisting of a rubber material connected to a rubber ring and a quick-release valve with an attachable screw on a cap.

5. The kinesthetic waterpark of claim 2, wherein the canopy comprises a woven canvas or a nonwoven canvas or a laminate comprising a fabric and a metalized film.

6. The kinesthetic waterpark of claim 2, wherein the pump handle comprises a hand-operated pump handle or a circular crank or a lever.

7. The kinesthetic waterpark of claim 2, wherein the pattern comprises the spray tubes aligned parallel to the perimeter of the canopy.

8. The kinesthetic waterpark of claim 2, wherein the pattern comprises the spray tubes aligned in parallel hexagonal arrangements located over the occupants of a wagon.

* * * * *